United States Patent
Gendell

(10) Patent No.: US 9,487,265 B2
(45) Date of Patent: Nov. 8, 2016

(54) VARIABLE LEVER AND GEAR TRANSMISSION SYSTEM AND METHOD

(71) Applicant: Alexander Gendell, Hoboken, NJ (US)

(72) Inventor: Alexander Gendell, Hoboken, NJ (US)

(\*) Notice: Subject to any disclaimer, the term of this patent is extended or adjusted under 35 U.S.C. 154(b) by 0 days.

(21) Appl. No.: 14/545,650

(22) Filed: Jun. 2, 2015

(65) Prior Publication Data
US 2015/0353165 A1 Dec. 10, 2015

Related U.S. Application Data

(63) Continuation-in-part of application No. 13/986,509, filed on May 8, 2013, now Pat. No. 9,079,632.

(51) Int. Cl.
*B62M 1/30* (2013.01)
*B62M 1/32* (2013.01)

(52) U.S. Cl.
CPC .............. *B62M 1/30* (2013.01); *B62M 1/32* (2013.01); *Y10T 74/18056* (2015.01)

(58) Field of Classification Search
CPC .............................. B62M 1/30; B62M 1/32
See application file for complete search history.

(56) References Cited

U.S. PATENT DOCUMENTS

| | | | | |
|---|---|---|---|---|
| 1,447,119 A | * | 2/1923 | Brown | B62M 1/14 280/254 |
| 1,597,639 A | * | 8/1926 | Von Glahn | B62M 1/32 280/254 |
| 1,867,687 A | * | 7/1932 | Van Etten | B62M 1/32 280/254 |
| 2,076,804 A | * | 4/1937 | Winding | B62K 3/002 188/24.11 |
| 4,135,409 A | * | 1/1979 | Ishimaru | B62M 11/06 280/252 |
| 5,351,979 A | * | 10/1994 | Langen | B62K 21/00 280/254 |
| 5,716,069 A | * | 2/1998 | Bezerra | B62M 1/30 280/253 |
| 2006/0038374 A1 | * | 2/2006 | Montez | B62K 5/023 280/244 |
| 2012/0061940 A1 | * | 3/2012 | Kramer | B62M 1/28 280/252 |
| 2014/0333043 A1 | * | 11/2014 | Gendell | B62M 1/30 280/253 |

\* cited by examiner

*Primary Examiner* — Kevin Hurley
*Assistant Examiner* — Gabriela C Craciun
(74) *Attorney, Agent, or Firm* — Douglas C. Wyatt

(57) ABSTRACT

Phase gear and lever mechanism converts reciprocating power to rotary power with phase gear providing power stroke of greater duration than travel stroke so as to develop efficient power through a power stroke. A modified lever and gear mechanism converts reciprocating power to rotary power at variable out power ratio. In addition, an alternative embodiment of the variable lever is for use with the phase gear is provided.

5 Claims, 16 Drawing Sheets

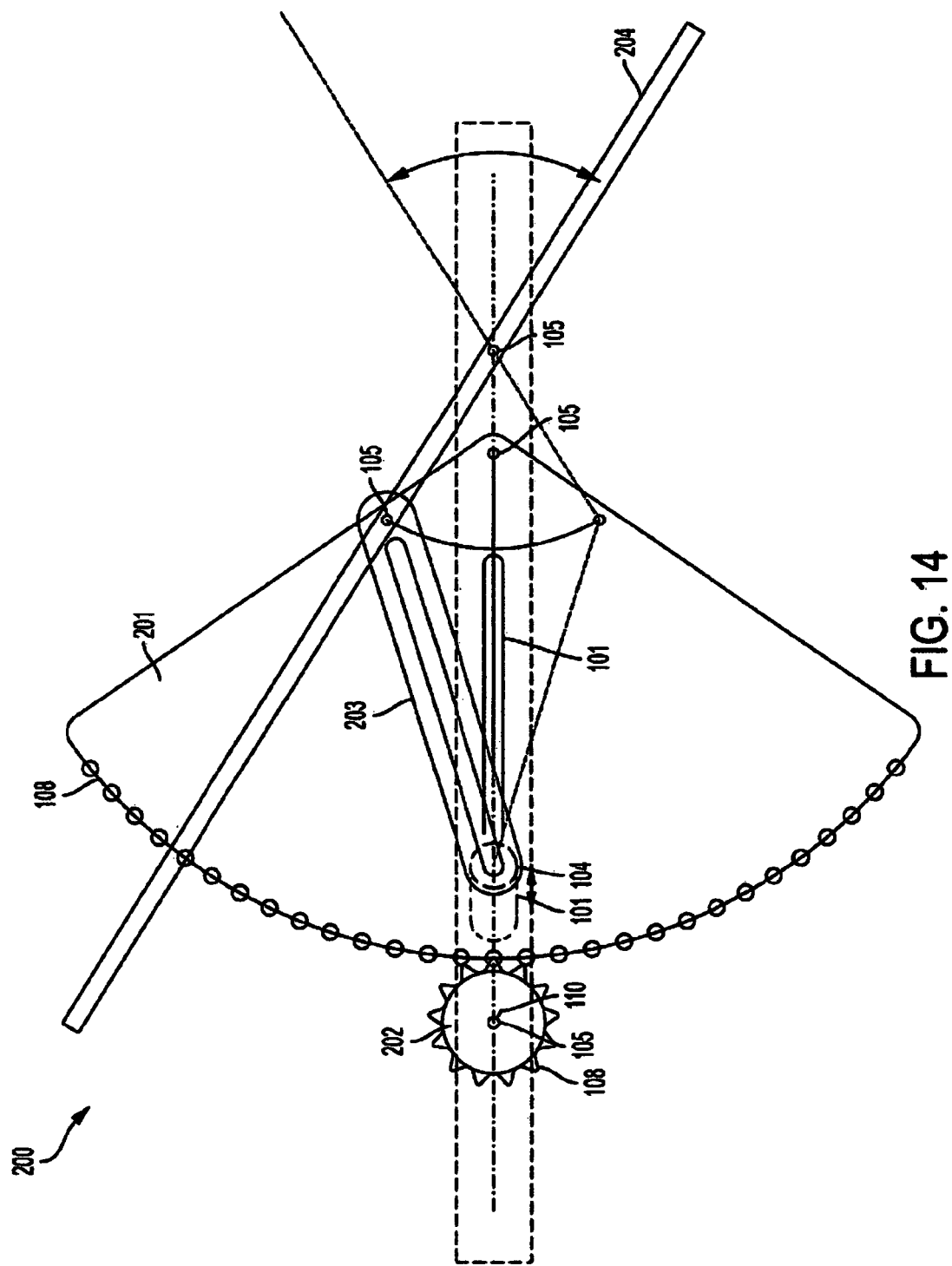

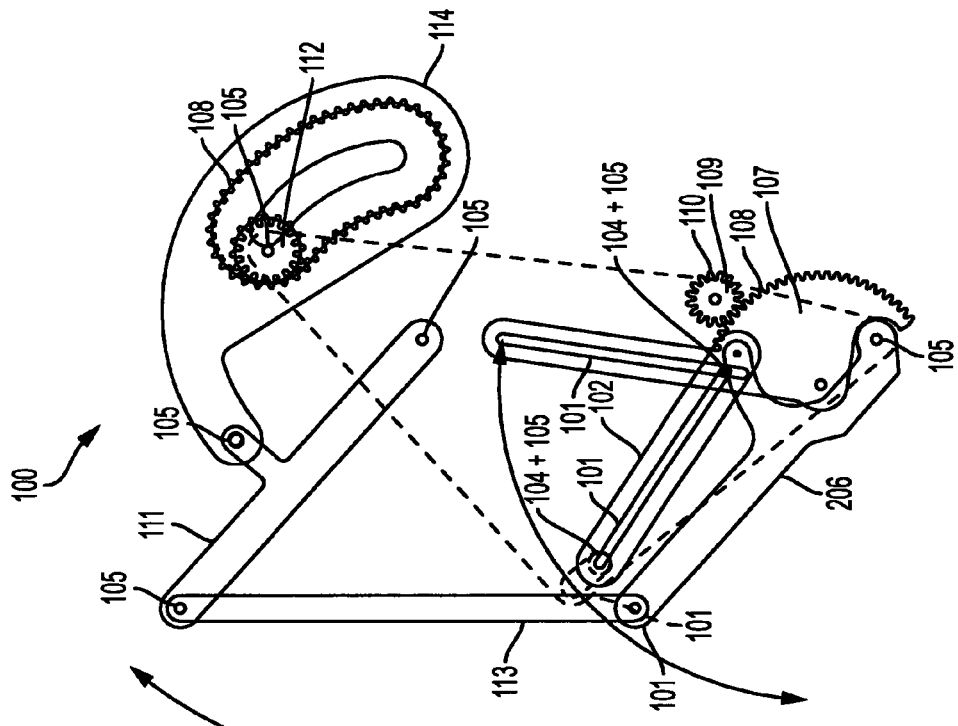
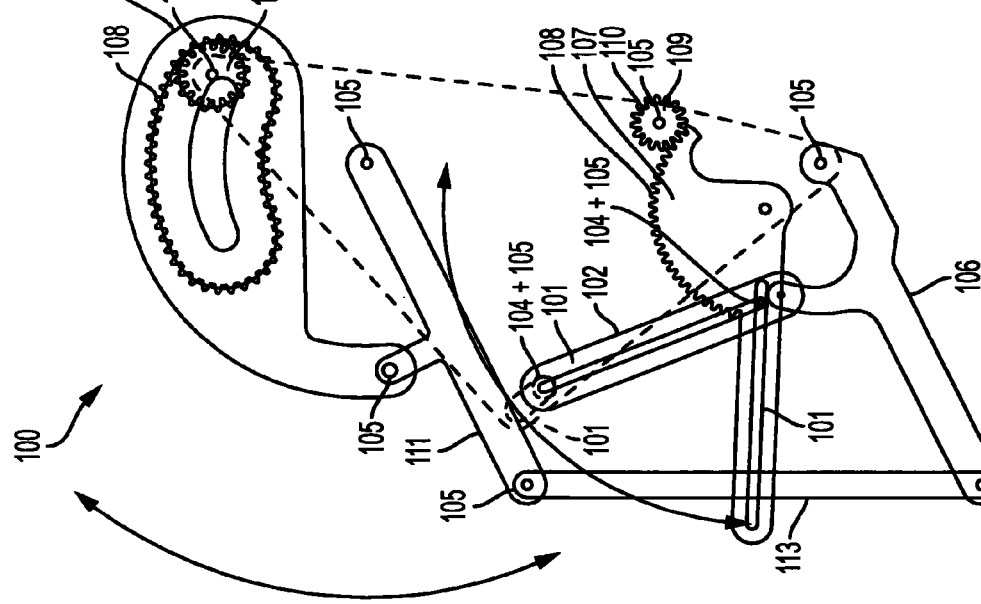

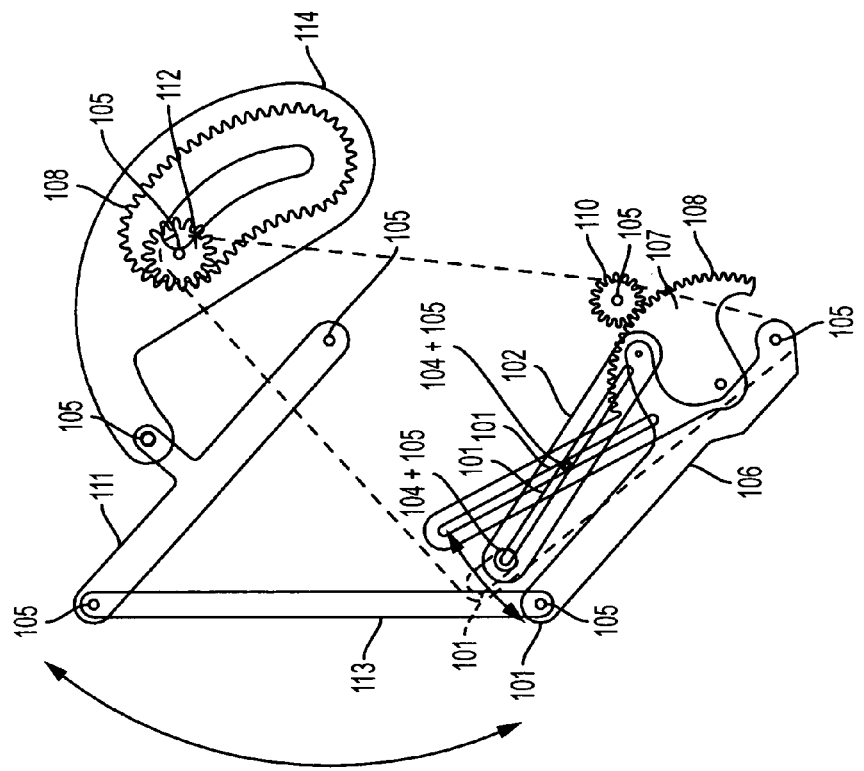
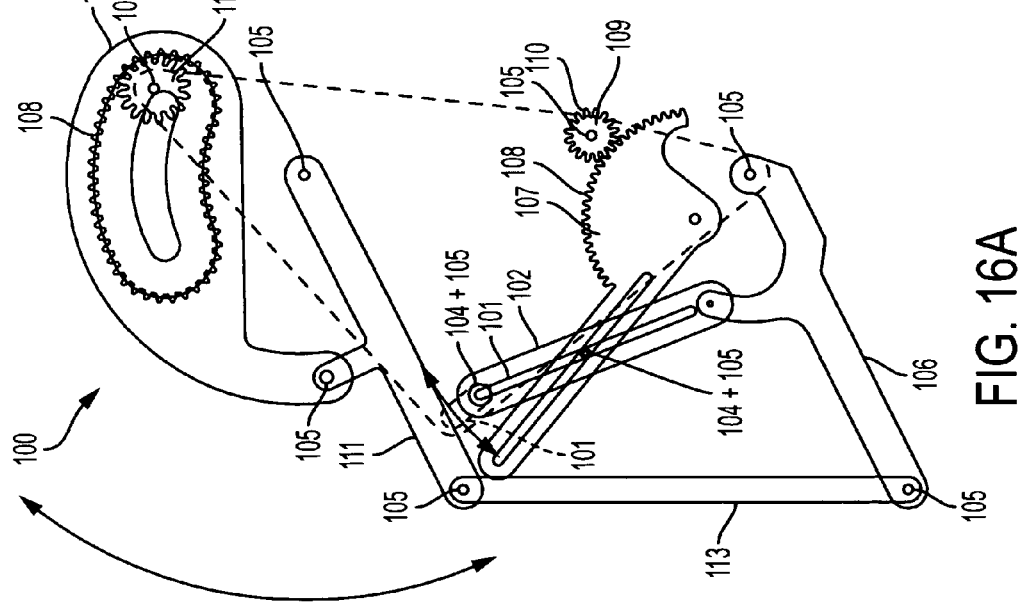
FIG. 16B
FIG. 16A

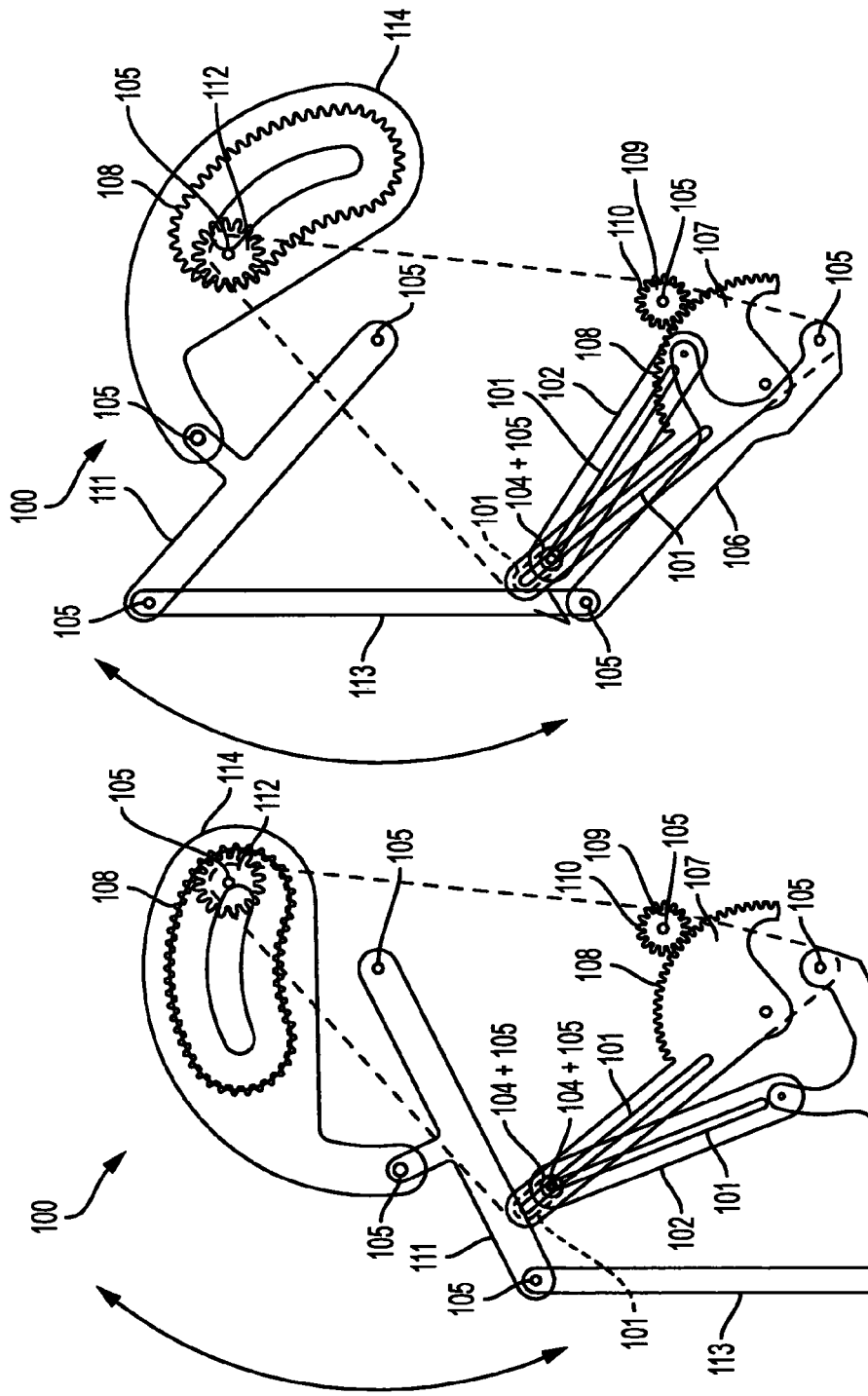

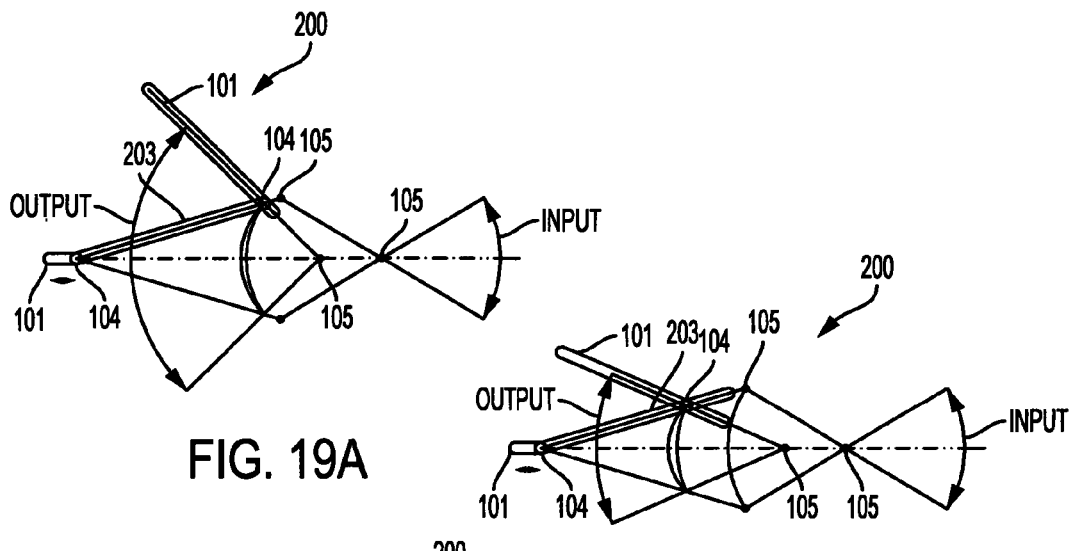
FIG. 19A
FIG. 19B
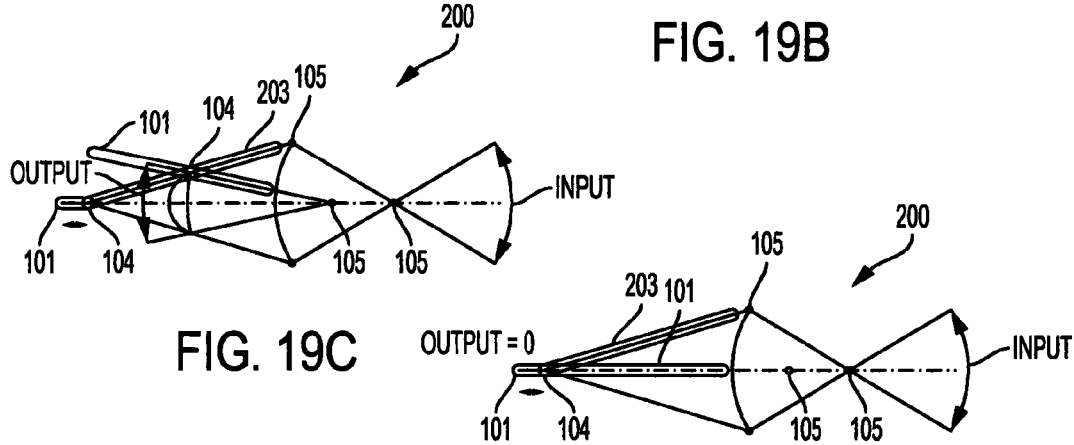
FIG. 19C
FIG. 19D
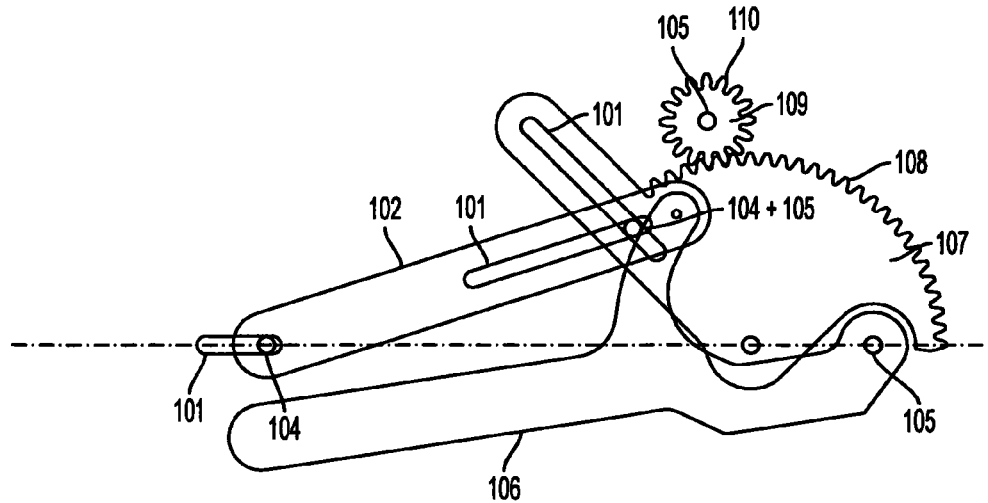
FIG. 19E

VARIABLE LEVER AND GEAR TRANSMISSION SYSTEM AND METHOD

PRIORITY

This application claims priority to pending U.S. patent application Ser. No. 13/986,509 filed on May 8, 2013, which claims priority to U.S. Provisional Application Ser. No. 61/688,152, filed May 9, 2012.

BACKGROUND OF THE INVENTION

This invention relates to conversion of linear motion into circular or rotary motion (or vice versa) and particularly to mechanisms for conversion.

Linear motion such as a leg pushing down on a pedal, or a cylinder travelling down a shaft defines a down and up cycle that is typically converted to circular motion by means of a crank, as for example, bicycle cranks and pedals, or a crankshaft in an automotive engine. The down and up cycle consists of a down or power stroke where energy is being applied and converted to circular motion, and an up or travel stroke. With a crank, the power and travel strokes are identical.

The transfer of energy itself is not linear but follows the curve of a circle. FIG. 1 represents cycles of pedal and crank motion for a bicycle with power and travel of one pedal shown in solid line A, and the other pedal in dash line B. The median line C shows power and travel motion is symmetrical for each pedal. The more horizontal the curve shown in solid line, the more efficient is the energy transfer. There are only two points in a cycle at which the vector of power is applied perpendicular to the crank and where power application is 100% efficient. Also, for each cycle, there are two points where no energy is being transferred, no matter how much force is being applied. These are the "O" power positions of FIG. 1. With bicycle pedals "O" positions are overcome by legs moving back and forth as well as up and down. So, when one pedal is fully down and the other fully up, we apply forward motion to "nudge" the pedals into position where power can be applied. With an engine crankshaft, the "O" position is overcome by flywheel inertia.

SUMMARY OF THE INVENTION

The present invention provides a lever powered gear mechanism producing a transfer of energy that is many times more linear depending on the length of the lever that drives the gear. Since the lever does not need to go full circle, the lever can be as long as desired. The longer the lever, the more efficient is the mechanism.

The lever powered gear mechanism is characterized in a power cycle or stroke that is longer than the travel cycle or stroke, meaning that for one "rotation" of the gear there is more time that power is transferred. For each rotation of the gear there are two "O" positions. However with two gears connected to the same shaft, we have continuous power because power cycles or strokes overlap. This is because power and travel strokes are asymmetrical. In the case of a bicycle with two gears, the leg pushing down is moving slower that the leg travelling up. So at some point, both legs are pushing down at the same time. FIG. 2 of the drawing illustrates two cycles of power and travel strokes of a bicycle having two gears with solid line D representing strokes of a first gear, and dash line E a second gear. The horizontal segments of the curve shown in solid line for a first gear provide efficient energy transfer for substantially the entire power stroke. Moreover the power stroke is of greater duration than travel stroke. This is because power and travel strokes are asymmetrical as indicated by position of median line F. A second gear with travel and power strokes shown in dash line E operates in a similar manner to provide efficient energy transfer for substantially its entire power stroke. Together, the first and second gears provide continuous, efficient energy transfer from power lever to driven gear.

The phase gear that provides efficient energy transfer according to the invention is an integral gear composed of four different gear segments, with four radii corresponding to power segment, travel segment, and two joiner segments. The power segment is an internal gear, the travel segment an external gear with a radius smaller than the power segment. The joiner segments are segments of internal gears that smoothly transition from one stroke to the other. There are infinite arrangements of pivots and lever lengths as well as different aspect ratios of power and travel segments determined by geometry to meet power transmission requirements in specific applications.

The ordinary way for changing power ratios in transmission systems is by means of shifting between different physical gears in a gear box. A modified embodiment of lever powered gear mechanism of this invention allows a different system for changing the power ratio in a transmission system. In this embodiment, a lever drives a segment gear in power and travel strokes in a mechanism where lever and gear have independent pivot points, and where the lever and gear are connected by an adjustable cog. The reciprocating lever and segment gear mechanism delivers rotary motion to a driven gear. The point of cog connection between lever and segment gear is adjustable in relation to lever pivot point so as to provide a variable gear ratio between the segment gear and the driven gear. A cog point of connection closer to lever pivot point gives a higher gear ratio, and connection further from lever point gives a lower gear ratio.

The present invention has for a chief objective a lever operated gear transmission system for continuous and efficient energy transfer at fixed and variable gear ratios.

Furthermore, the present invention includes improvements to the lever and gear mechanism. Specifically, it is an object to provide a transmission converting reciprocating motion to rotary motion of varying speed. This is important if the transmission is to be used with any rotary engine as input. The improved gear and lever mechanism addresses the need to adapt a device for converting reciprocating motion into rotary motion (which works for linear input, namely legs, pistons, linear electric motors, etc) for use with rotary engines. Accordingly, instead of the lever (or pedal) driving the phase gear and the phase gear driving the wheel—the gear that synced the movement of the phase gear now becomes the input. Thus, the phase gear drives a variable lever via a reciprocating movement, and the variable lever outputs rotary movement.

It can be appreciated by person of ordinary skill in the art that the device can be adapted to a frame, such as a transmission housing, and the dimensions of the herein described levers and phase gears can be adapted from the teachings herein to numerous other dimensions and configurations, according to the needs to be solved by the device.

Also described is a variable lever which can be adapted to the gear transmission system, or used independently as a ratcheting mechanism of infinitely variable gear ratio.

Specific examples are included in the following description for purposes of clarity, but various details can be changed within the scope of the present invention.

OBJECTS OF THE INVENTION

An object of the invention is to provide lever and gear transmission systems for efficient energy transfer from power input to power output.

Another object of the invention is to provide a lever powered phase gear mechanism with a power stroke that is longer than the travel stroke such that for one cycle of the mechanism there is more time when power is transferred.

Another object of the invention is to provide a lever powered phase gear mechanism for a bicycle.

Another object of the invention is to provide a lever powered cog gear mechanism having variable gear ratio.

Another object of the invention is to provide a lever powered cog gear mechanism having variable gear ratio adapted for powering a bicycle.

Other and further objects of the invention will become apparent with an understanding of the following detailed description of the invention or upon employment of the invention.

BRIEF DESCRIPTION OF THE DRAWINGS

A preferred embodiment of the invention has been chosen for detailed description to enable those having ordinary skill in the art to which the invention appertains to readily understand how to construct and use the invention and is shown in the accompanying drawing in which:

FIG. 14 is a schematic diagram of an embodiment of a lever power transmission system according to the invention in a fourth position.

FIG. 15a is a schematic diagram of a modified embodiment of lever and phase gear power transmission system adapted for a high gear ratio in a first position.

FIG. 15b is a schematic diagram of the modified embodiment of lever and phase gear power transmission system of FIG. 15a in a second position.

FIG. 16a is a schematic diagram of a modified embodiment of lever and phase gear power transmission system adapted for an intermediate gear ratio in a first position.

FIG. 16b is a schematic diagram of the modified embodiment of lever and phase gear power transmission system of FIG. 16a in a second position.

FIG. 17a is a schematic diagram of a modified embodiment of lever and phase gear power transmission system adapted for an neutral gear ratio in a first position.

FIG. 17b is a schematic diagram of the modified embodiment of lever and phase gear power transmission system of FIG. 17a in a second position.

In FIG. 18, the power connector is shown by a circular belt or chain.

FIGS. 19 a-e illustrate an embodiment of a variable lever mechanism according to the invention showing the device in several positions.

DETAILED DESCRIPTION OF THE PREFERRED EMBODIMENT

Figure 3:
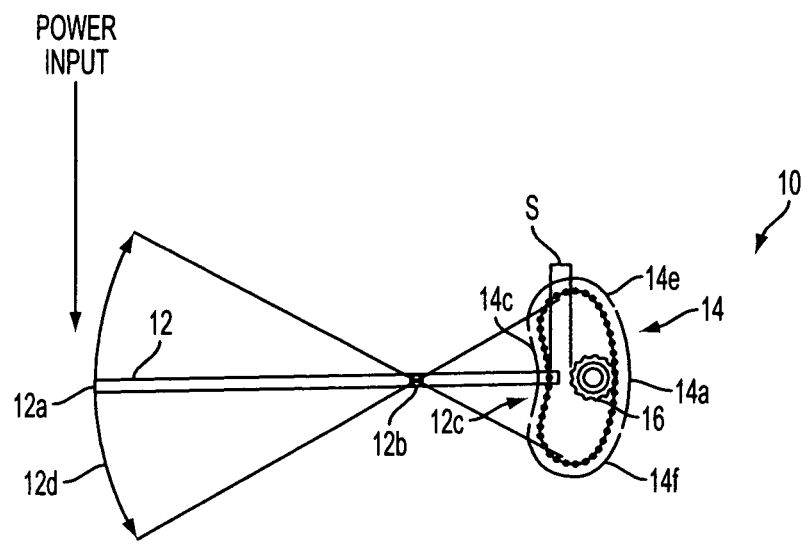
FIG. 3 is a schematic diagram of lever and phase gear power transmission system with phase gear power segment engaging a driven gear in a power stroke.
Figure 4:
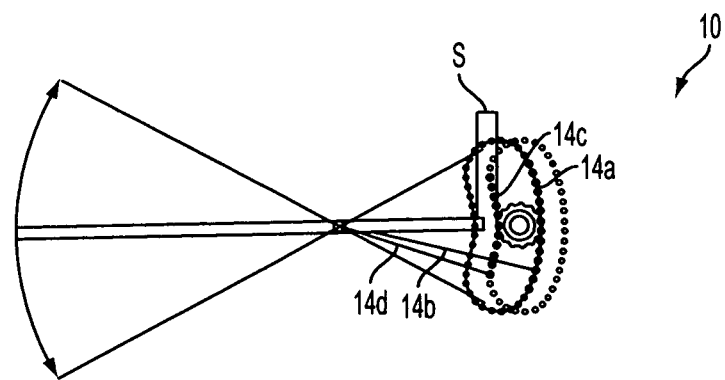
FIG. 4 is the diagram of lever and phase gear power transmission system of FIG. 3 with phase gear travel segment engaging a driven gear in a travel stroke.

Referring to the drawing, the present invention is directed to a preferred embodiment lever powered gear mechanism 10 shown in FIGS. 3 and 4 comprising power lever 12 and phase gear 14. Power lever has power input end 12a, pivot point 12b, and power output end 12c with pivot point closer to output end for increased leverage in delivering energy to phase gear 14 fixed at output end.

Phase gear comprises four different gear segments with four radii including power segment 14a with radius 14b originating at lever pivot point, travel segment 14c with radius 14d originating at lever pivot, and joiner segments 14e, 14f connecting ends of power segment with adjacent ends of travel segment. The joiner segments smoothly transition from power cycle to travel cycle and return to power cycle. When the power and travel cycles are done, phase gear shifts slightly as driven gear moves through the joiner segments. There is a parallel shift S of the phase gear induced by rotation of driven gear 16 through joiner segments. A shift is parallel as seen in FIG. 4 where power and travel segments remain parallel to their respective starting positions as they move through the shift. Where parallel shift is achieved the gear is symmetrical as in FIGS. 3 and 4.

Figure 1:
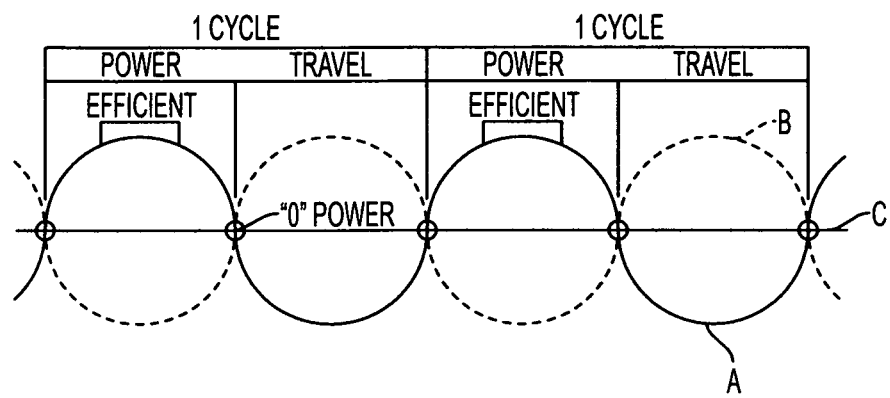
FIG. 1 is a diagram representing symmetrical power and travel strokes of conventional pedal and crank bicycle movement, or piston and crankshaft movement of an automotive engine.
Figure 2:
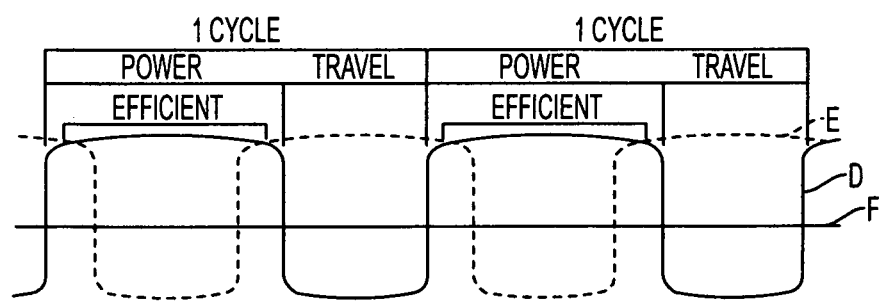
FIG. 2 is a diagram representing asymmetrical power and travel strokes of lever and phase gear power transmission system according to the invention.

The power segment radius 14b is greater than the travel segment radius 14d so that driven gear 16 moves faster through the power segment than the travel segment. The power stroke is of greater duration than travel stroke because of greater radius of power segment. The power segment and the travel segment are in effect two different gears as shown in FIG. 4 with bold ink illustration of power 14a and travel 14c segments. The phase gear power segment provides efficient power curve $D_p$ for each mechanism cycle as shown in FIG. 2. The travel segment with smaller radius than power segment results in shorter travel curve $D_t$ and consequent asymmetry of power and travel curves of FIG. 2 marked by line F.

Energy is developed by moving lever 12 through power input arc 12d and is transferred by phase gear power segment 14a to driven gear 16. The driven gear rotates always in the same direction, i.e., counterclockwise in FIGS. 3 and 4, as it sequentially engages power segment, joiner segment, travel segment, and joiner segment. The power segment and both joiner segments are external gears and the travel segment is an internal gear.

Figure 5A:
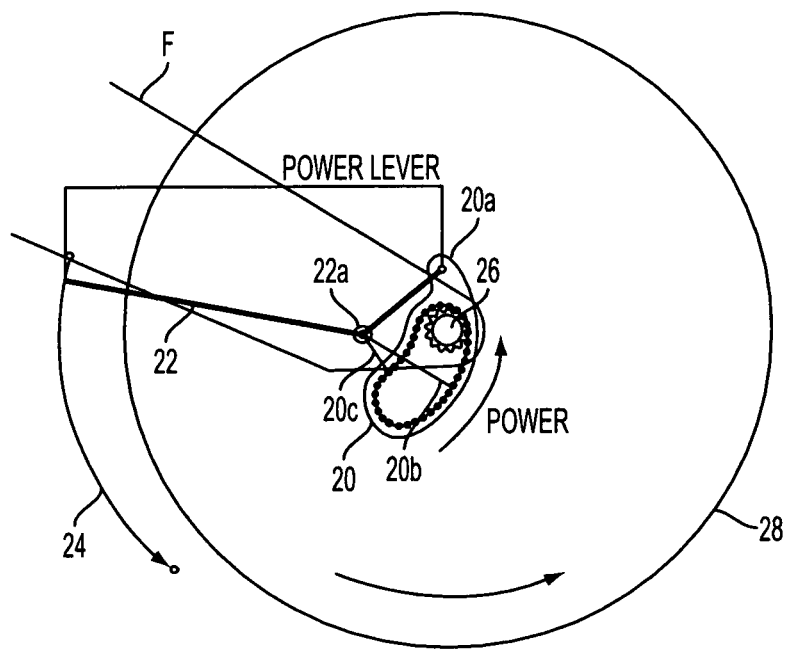
FIG. 5a is a schematic diagram of a modified embodiment of lever and phase gear power transmission system in phase for applying power to driven gear and wheel.
Figure 5B:
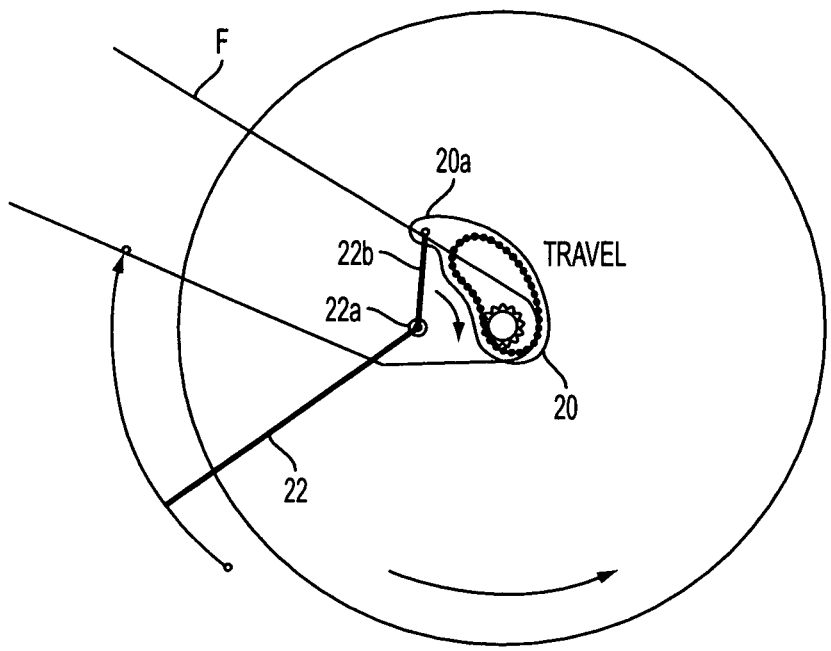
FIG. 5b is a schematic diagram of the modified embodiment of lever and phase gear power transmission system of FIG. 5a in travel phase.

Lever 12, phase gear 14, and driven gear 16 of FIGS. 3 and 4 execute cycles of power and travel seen in solid line D in FIG. 2. The horizontal segment of the solid line curve provides efficient energy transfer for substantially the entire power stroke. FIGS. 5a and 5b show a modified embodiment of the invention in providing for shift of phase gear 20 between power (FIG. 5a) and travel cycles (FIG. 5b). Gear pivot point 20a is placed outside the phase gear. Power lever 22 has pivot point 22a on machine frame F, and gear lever section 22b extending between lever pivot point 22a and gear pivot point 20a.

In moving the power lever through power stroke 24, the gear lever actuates phase gear through power segment 20b so as to turn driven gear 26 and wheel 28 in the direction of arrow W. Offset gear pivot 20a accommodates phase gear shift through joiner segment 20c to travel segment 20d, and again from joiner segment 20e to power segment 20b. When the driven gear reaches joiner segment 20c as it leaves the power segment and before it enters the travel segment, rotation of the driven gear causes the entire phase gear to pivot or shift slightly on axis 20a.

In moving the power lever through travel stroke 27, the gear lever moving in the direction of arrow G actuates phase gear through travel segment 20d so as to turn driven gear 26 through joiner segment 20e to power segment 20b. When the driven gear reaches joiner segment 20e as it leaves the travel segment rotation of the driven gear causes the entire phase gear to pivot or shift slightly on axis 20a to position of FIG. 5a.

Where shift is achieved by slight pivoting motion as in FIGS. 5a-b, the phase gear has an asymmetrical "eggplant shape".

The radius 23 (FIG. 5b) of power segment originating at lever pivot point 22a is greater than radius 25 of travel segment thereby maintaining asymmetry of power and travel cycles with power cycle being longer.

Figure 6:
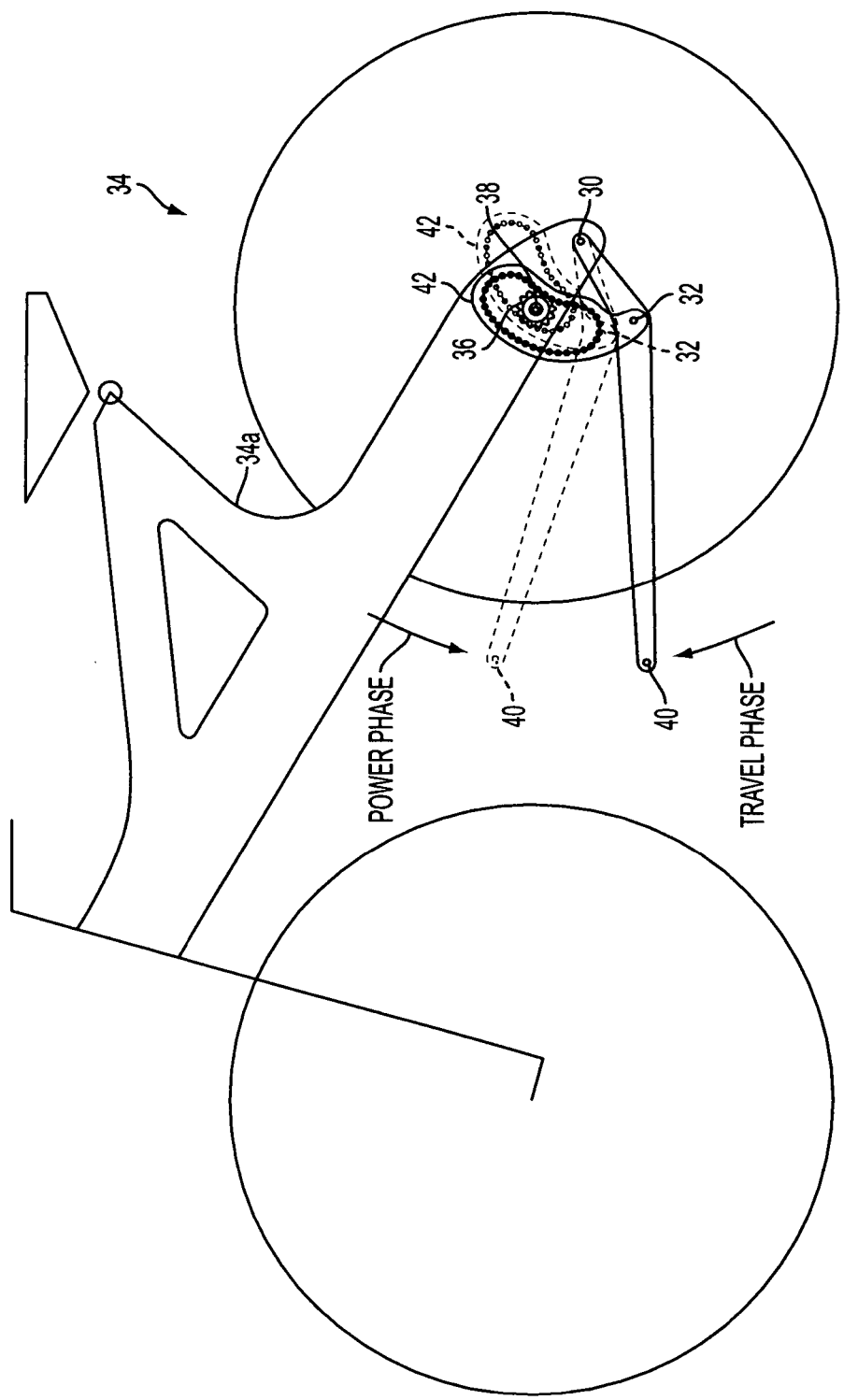
FIG. 6 is a schematic diagram of another modified embodiment of the invention illustrating a dual lever and phase gear fixed gear ratio transmission system for a bicycle.

There are infinite arrangements of pivot points and lever lengths as well as different aspect ratios of power and travel segments determined by geometry. For example, main power lever pivot 30 can be beyond the gear pivot 32 as shown in FIG. 6. In a bicycle 34 with driven gear 36 on wheel hub 38, a power lever 40 has pivot point 30 on bicycle frame F. Each offset gear pivot 32 attached to a phase gear 42 connects to a power lever 40 at a point intermediate lever ends. Movement of each power lever through power phase transfers energy to driven gear through a phase gear power segment 42a, shifts through joiner segment to travel segment, and shifts again through joiner segment to travel segment 42b.

The bicycle shown in FIG. 6 has dual power lever and phase gear drive mechanisms with one shown in full lines the other in phantom. A cycler operating these power levers develops continuous efficient power delivered to driven gear as represented by solid and dash line power curves of FIG. 2. The full line mechanism of FIG. 6 is in travel phase moving upward with travel segment engaging driven gear. The phantom line mechanism is early in power phase moving downward with power segment engaging driven gear. In the embodiment of FIG. 6, the radius of each power segment originates at lever pivot point 30 and is greater than radius of travel segment so as to maintain asymmetry of power and travel cycles with power cycle being longer. It is to be understood in observing the position of each phase gear in FIG. 6 that by reason of asymmetry of power and travel cycles of the mechanism, both power levers will be in power phase for a portion of mechanism operation. The phase gears of FIG. 6 shift slightly between power and travel cycles by driven gear rotation in substantially the same manner as for mechanism of FIGS. 5a-b.

Figure 7:
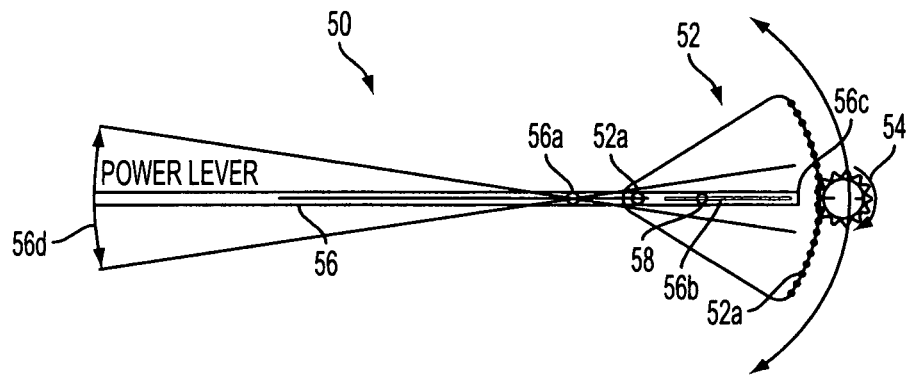
FIG. 7 is a schematic diagram of another modified embodiment of the invention illustrating a lever and segment gear mechanism with variable gear ratio for driven output gear.
Figure 8:
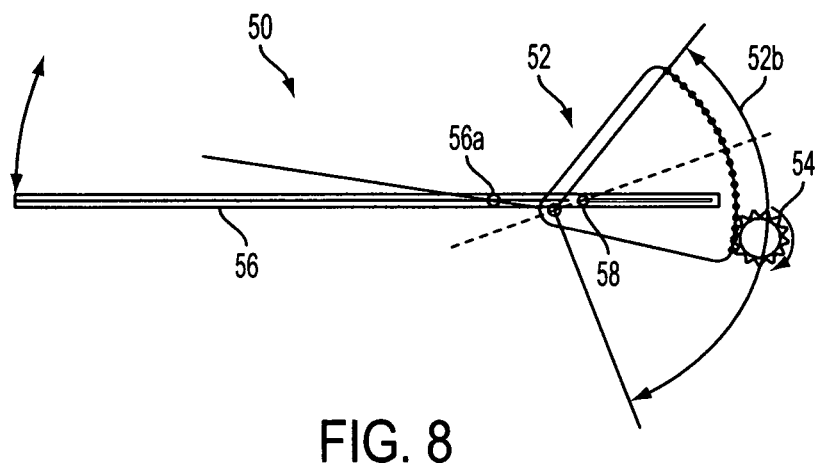
FIG. 8 is a schematic diagram of mechanism of FIG. 7 with high gear ratio for driven output gear.
Figure 9:
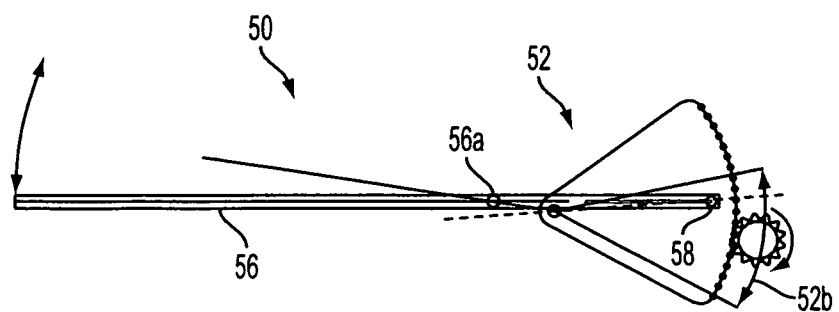
FIG. 9 is a schematic diagram of mechanism of FIG. 7 with low gear ratio for driven output gear.

A lever powered gear mechanism of this invention provides means for changing the power ratio in a transmission system and is shown in FIGS. 7-9. With lever 50 power transmission, a drive gear 52 does not go full circle, but moves back and forth. The drive gear is "pie" shaped gear segment, with gear teeth 52a fully meshed with teeth of driven gear 54. Power lever 56 has pivot point 56a and cog track 56b, with the cog track situated between pivot point and output end 56c of lever. A pie shaped drive gear segment moved by power lever has gear pivot 52a independent of the lever pivot point and clear of lever movement. The center of rotation of the lever is offset from the center of rotation of the drive gear, and the power lever has fixed arc of travel 56d.

The power lever is provided with a cog 58 moveable along the cog track, and with the cog in engagement with the drive gear 52. By moving the cog to change its point of connection to the drive gear, the arc of travel 52b of the drive gear changes and the cog controls gear ratio of the mechanism. When the cog 58 is closer to the center of rotation 56a of the lever (FIG. 8), the drive gear arc of movement is greater. The arc of movement is smaller when the cog 58 is further away from the center of rotation 56a (FIG. 9). Thus, moving the cog closer to center of rotation results in a higher ratio between travel of lever and the travel of the drive gear. By positioning the cog further away results in a lower ratio between lever and drive gear. Since there is an infinite number of possible positions of the cog, there is an infinite number of ratios. There is slight slippage on the cog since the drive gear and power lever have different centers of rotation, however, that slippage is relatively minor.

Figure 10:
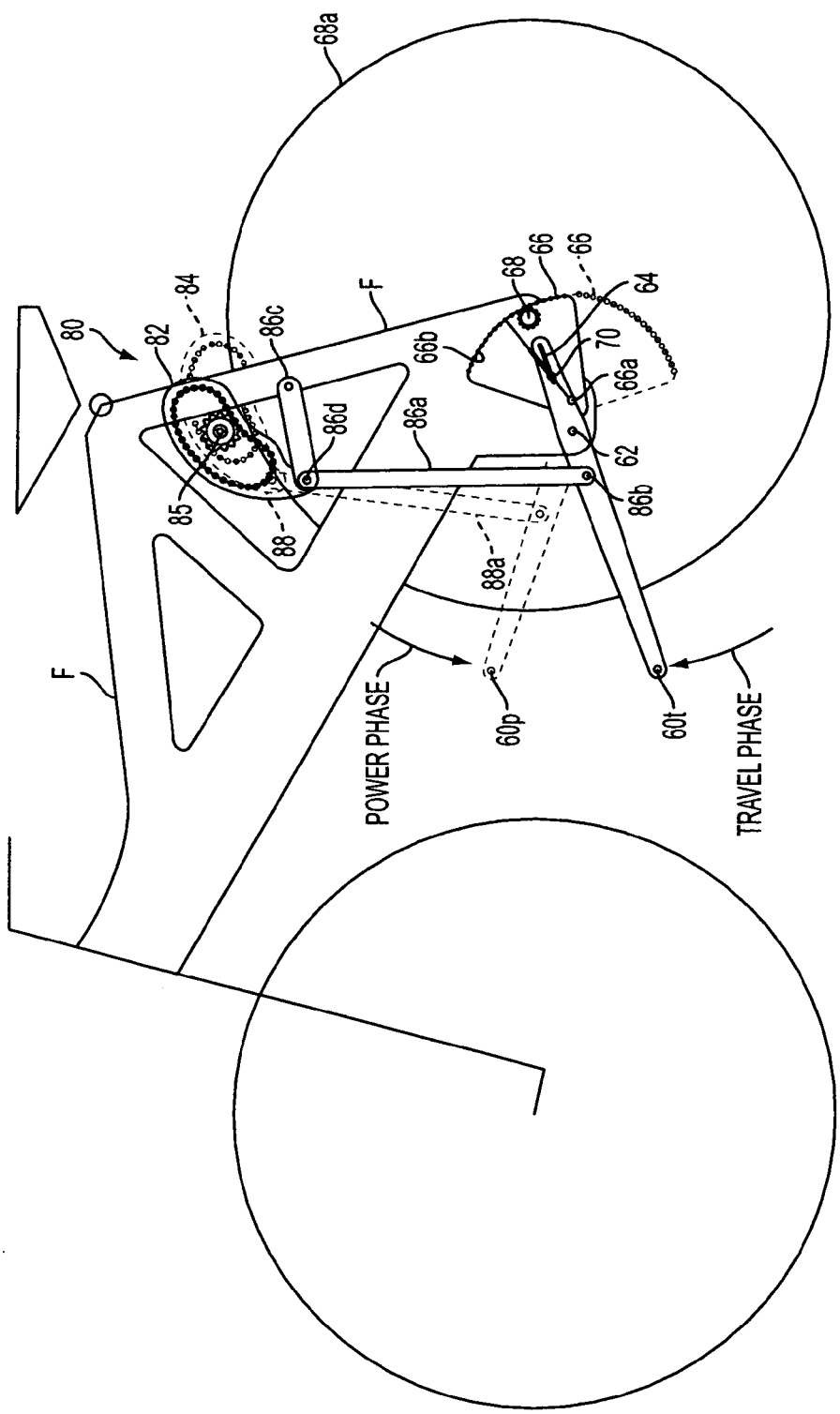
FIG. 10 is a schematic diagram of bicycle having dual main power lever and ratio segment gear mechanism of FIGS. 7-9 together with auxiliary phase gear and lever mechanism for synchronizing movement of main power levers.

FIG. 10 illustrates a bicycle with rear wheel driven by dual lever gear mechanism similar to that of FIGS. 7-9, including main power levers 60p-t with power lever pivots 62 on bicycle frame F, and with cog tracks 64. Drive gears 66 are "pie" shaped segments with pivots 66a on bicycle frame and with internal gear segments 66b for rotating driven gear mounted on wheel hub 68. The gear ratio is controlled according to position of cogs 70 in cog tracks as point of connection between power levers and drive gears. A cyclist powers the bicycle with up and down movement of power levers and selected gear ratio.

Up and down action of the power levers is synchronized by phase gear and lever mechanisms 80. The phase gear and lever mechanisms do not drive anything and instead receive reciprocating up and down movement by means of their lever connections to main power levers.

The dual phase gear and lever mechanisms 80 synchronize power and travel strokes of main power levers so there is constant power applied to wheel hub 68 and wheel 68*a*.

The dual phase gear and lever mechanisms 80 share synchronizing gear 85 mounted on a gear hub fixed to the bicycle frame, with gear teeth engaging each phase gear 82, 84 as shown in FIG. 10.

The first phase gear and lever mechanism 86 comprises lever 86*a* with pivot attachment 86*b* to main power lever 60*t* and pivot attachment 86*c* to the frame. There is also lever pivot 86*d* to phase gear 82.

The second phase gear and lever mechanism 88 comprises the same lever components and attachments as the first mechanism. The first and second phase gears and lever mechanisms are at different stages in power and travel strokes by reason of their linkage to main power levers at different stages.

So, as seen in FIG. 10, as main power lever 60*p* moves downward in power stroke and pulls second lever 88*a*, the power segment of second phase gear 84 engages and turns synchronizing gear 85. At the same time, the synchronizing gear engages and drives the travel segment of first phase gear 82 causing it to move to the right, and by means of lever 86*a*, to move main power lever 60*t* in upward travel stroke.

The result is that since main power levers 60*p-t* and their segment gears do not travel full circle, the dual synchronizing phase gear and lever mechanisms each act as a free wheel so that main power levers move freely through travel strokes to starting position for next power stroke.

The bicycle of FIG. 10 is driven by dual main lever and gear power with variable gear ratio selected by position of gear ratio control cog in cog track, and with drive levers synchronized in power and travel strokes by dual phase gear and lever mechanisms. The bicycle's main power drive arrangement is such that different gear ratios may be selected for each main lever according to its gear ratio control cog setting.

Various changes may be made to the structure embodying the principles of the invention. For example, it can be appreciated that an alternative embodiment of an ear gear according to the invention includes a gear wherein the gear segments are inverted so that the phase gear is a mostly external rather than an internal gear. Because of the involute geometry of the teeth, this alternative may be preferable when the driven gear is much smaller in proportion to the phase gear. In addition, or in the alternative, another example of an alternative embodiment of a level according to the invention is in the case of the vari-lever driving the wheel, and the phase-gear acting only as a syncing mechanism as shown in FIG. 10. Such an embodiment can be provided to have a 1 way clutch (freewheel) inside the driven gear.

Figure 11:
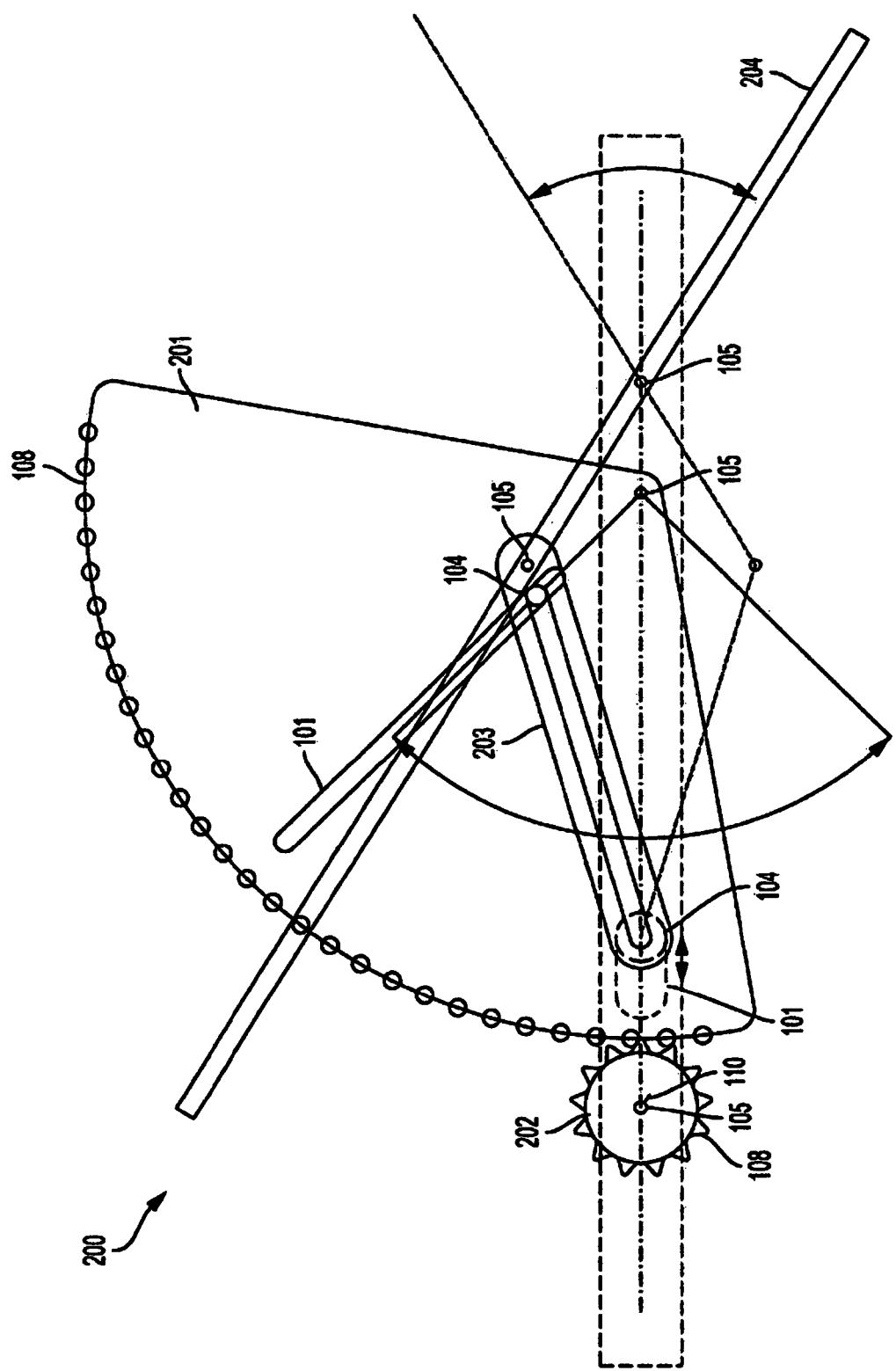
FIG. 11 is a schematic diagram of an embodiment of a lever power transmission system according to the invention in a first position.

FIG. 11 is a schematic diagram of an embodiment of a lever power transmission system according to the invention in a first position.

The variable lever mechanism comprises several main parts, including a lever frame 205, a drive gear 201, and output gear 202, a power transfer lever 203, and an input lever 204, The lever frame 205 comprises a first pivot, a second pivot, a third pivot 105, and a first cog track 101 with a first cog 104 slidably disposed therein.

It can be appreciated by a person of ordinary skill in the art that the lever frame is intended as a frame or base for positioning of the interacting elements of the invention and the transmission of force among them. Accordingly, the lever frame can be of different shapes and sizes but typically may be elongate in form.

The pivots can be formed from various mechanical devices, which allow rotation around a point on a plane, among other things.

The drive gear 201 is rotatably connected to the second pivot of the frame 205, wherein the drive gear includes a gear surface 108 along at least a portion of its outer edge, wherein the drive gear 201 further includes a second cog track 101 with a second cog 104 slidably disposed therein.

It can be appreciated by ordinary persons of the art that the gear surface 108 can be formed of alternative cooperating mechanisms for transferring mechanical force in a rotational manner from one part to another.

The power transfer lever 203 comprises a third cog track with a third cog 104 slidably disposed therein, which power transfer lever 203 is rotatably connected at a first end of the power transfer lever 203 to the first cog 104 of the lever frame 205, and a second end of the power transfer lever 203 is rotatably connected to a first portion of an input lever 204, and wherein the third cog 104 is rotatably connected to the second cog 104 of the drive gear 201.

It can be appreciated by a person of ordinary skill in the art that the first cog track and third cog track can be disposed on different sides of the power transfer lever 203.

The input lever 204 is rotatably connected at a second portion of the input lever 204 to the frame at the third pivot of the frame.

They can be appreciated by person of ordinary skill in the art that force can be applied to the input lever 204 at one or more portions of the input lever 204.

The output gear 202 comprises a continuous gear surface 108 which cooperates with the gear surface of the drive gear 201, wherein the output gear 202 is rotatably connected to the first pivot of frame 205.

It can be appreciated by a person of ordinary skill in the art in light of the teachings of this disclosure that the output gear 202 can cooperate with the different embodiments of the invention shown herein, including, FIGS. 1-10.

In an alternative embodiment, of the variable lever mechanism according the invention the output gear 202 further comprises a one-way clutch.

The variable lever is basically a ratcheting mechanism, of infinitely variable gear ratio. It could be useful just as a hoist for heavy lifting. For example, an embodiment of the mechanism can be used as a "come along" winch used for pulling heavy materials, but where you can adjust the speed/power of the cable to any setting just by moving the cog.

In the alternative, the variable lever can be adapted for use with the phase gear mechanisms described herein and shown in FIGS. 1-10.

It can be appreciated by a person of ordinary skill in the art that reverse motion can be achieved simply by reversing the direction of the ratchet.

The variable lever includes a power transfer lever 203, which allows for an infinitely variable gear ratio (going from any desired gear ratio all the way to neutral)—something that wouldn't be possible without that member.

In the earlier embodiments of FIGS. 1-10, the ratio was continuously variable between 2 ratios, but no neutral). Neutral isn't very important for a bike, but for another type of transmission, it is great to be able to shift to neutral without physically disengaging any of the mechanisms. In addition, new intermediate member, the power transfer lever 203 also improves the linearity of the input/output ratio greatly.

Figure 12:
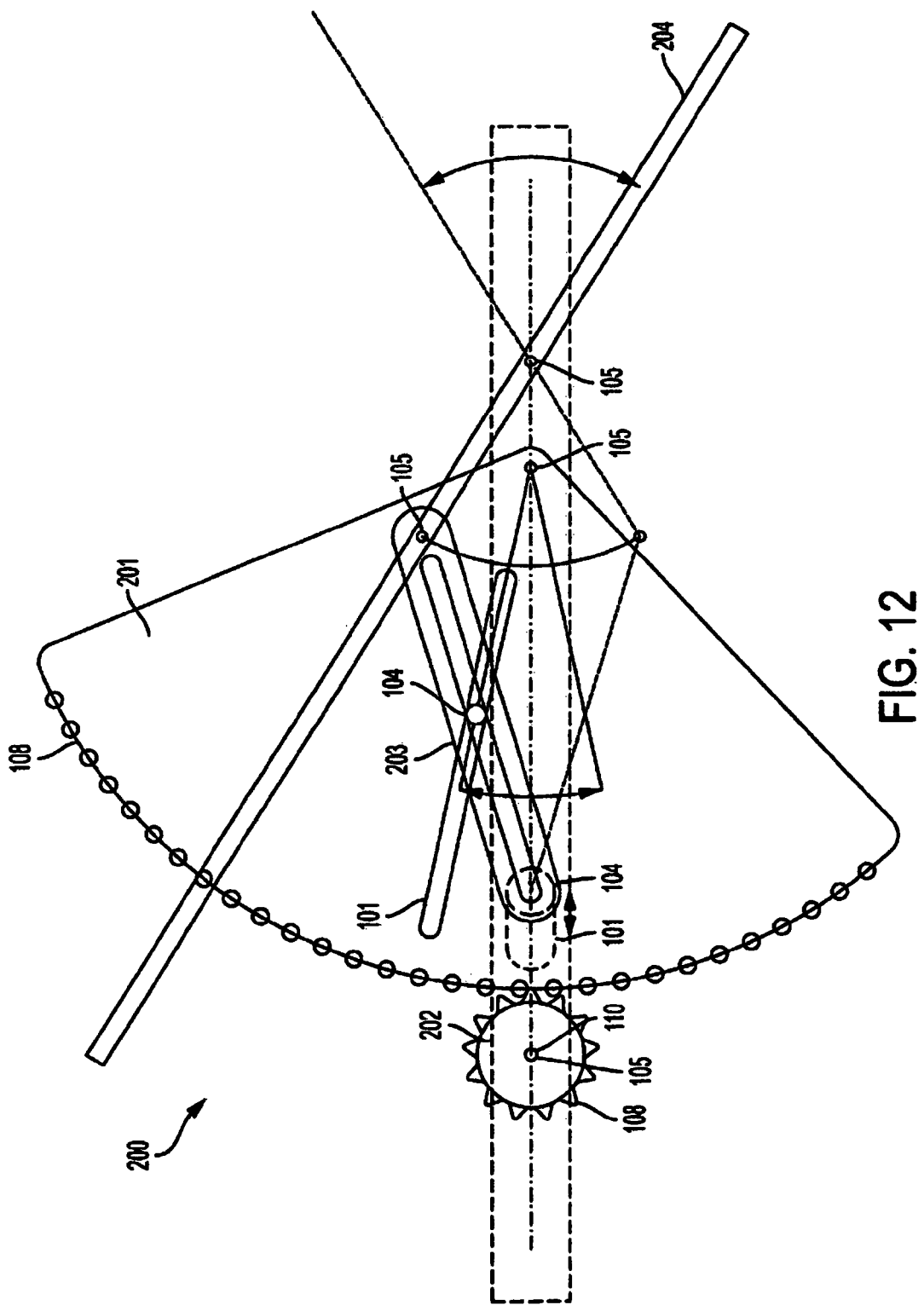
FIG. 12 is a schematic diagram of an embodiment of a lever power transmission system according to the invention in a second position.

FIG. 12 is a schematic diagram of an embodiment of a lever power transmission system shown in FIG. 11 in a second position.

Figure 13:
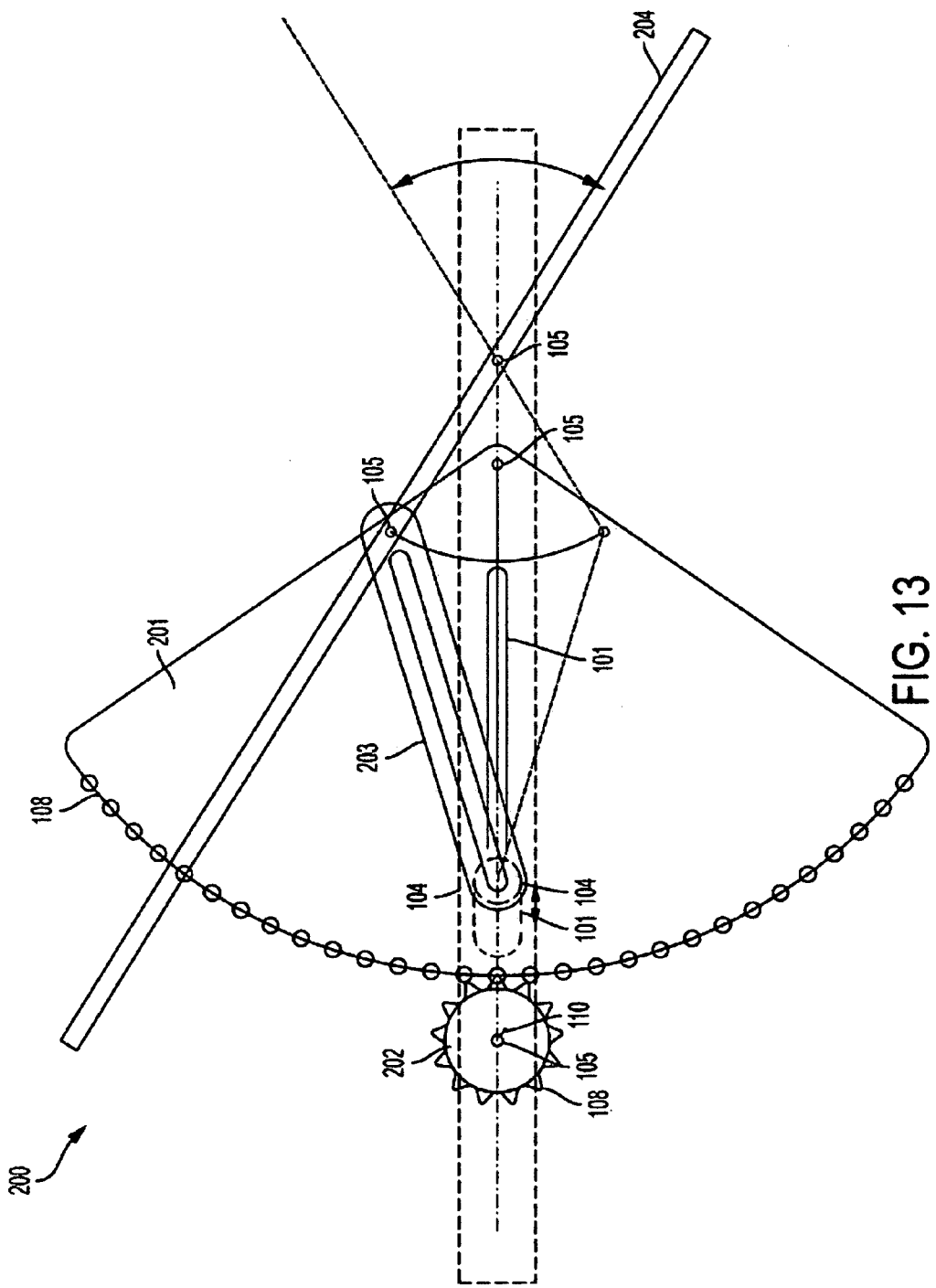
FIG. 13 is a schematic diagram of an embodiment of a lever power transmission system according to the invention in a third position.

FIG. 13 is a schematic diagram of an embodiment of a lever power transmission system shown in FIG. 11 in a third position.

FIG. 14 is a schematic diagram of an embodiment of a lever power transmission system shown in FIG. 11 in a fourth position.

FIG. 15a is a schematic diagram of a modified embodiment of lever and phase gear power transmission system adapted for a high gear ratio in a first position.

FIG. 15b is a schematic diagram of the modified embodiment of lever and phase gear power transmission system of FIG. 15a in a second position.

The lever and phase gear mechanism can be attached to a frame for transmitting force between a drive shaft and output gear.

The lever and phase gear mechanism 100 comprises a first lever 106, a second lever 111, a power connector 113, a power transfer lever 102, a gear transmission 107, a phase gear 114, and input gear 112, and an output gear 109.

The first lever 106 is rotatably connected to the frame at a first portion of the lever, and rotatably connected to the power transfer lever 102 at a second portion of the lever. In addition, the first lever is rotatably connected to a first portion of the power connector 113 at a third portion of the lever.

The power connector 113 includes a second portion which is rotatably connected to the second lever 111 at a first portion of the second lever.

The second lever includes a second and third portion, wherein the second portion of the second lever is rotatably connected to a first portion of the phase gear 114, and the third portion of the second lever is rotatably connected to the frame.

The phase gear 114, as described above with respect to FIG. 10, includes a continuous internal gear surface 108. The gear surface is adapted to cooperate with the input gear 112 (85) which is disposed within the phase gear in a manner such that it may cooperate with the internal gear surface of the phase gear.

The input gear 112 is rotatably connected to the frame and is adapted for connection to a drive shaft.

The power transfer lever 102 includes a power transfer lever cog track 101 and first cog pivot 104/105 slidably connected to the power transfer lever cog track 101.

It can be appreciated by person of ordinary skill in the art, that the first cog pivot 104/105 is a device which is slidably connected to the cog of the power transfer lever, and has a pivot disposed on one side for connection to another cog so that each cog is rotatably connected by a pivot.

In addition, the power transfer lever 102 includes a second pivot cog 104/105 at one end of the power transfer lever 102 for connection to a cog track 101 disposed at one portion of said frame.

It can also be appreciated by person of ordinary skill in the art, that the second cog pivot 104/105 is a device which is rotatably connected to the cog disposed in the cog track of the frame, and can be provided with a pivot disposed on one side for connection to another cog so that each cog is rotatably connected by a pivot.

The first cog pivot 104/105 is slidably and rotatably connected to a cog track 101 disposed disposed on or in the gear transmission 103.

The gear transmission 107 includes a gear surface 108 which cooperates with the output gear 109.

The output gear 109 is rotatably connected to the lever frame 205, and includes a continuous gear surface 108 which is adapted to cooperate with the gear surface of the gear transmission 107.

As described above, the phase gear has a continuous gear surface which includes a power segment, travel segment, first joiner segment between power segment and travel segment, and second joiner segment between travel segment and power segment, the power segment and the travel segment each having a radius of curvature originating at a lever pivot point, and the power segment having a greater radius than the travel segment.

In an alternative embodiment of the lever and phase gear mechanism 100 according to the invention, the output gear further includes a one-way clutch.

In another alternative embodiment of the lever and phase gear mechanism 100 according to the invention, the input gear further includes a one-way clutch connected to the drive shaft. The transfer of power from phase gear to variable lever can be by connecting a rod, by a belt, a chain, or other means.

Additionally, the input shaft can be coaxial with the output shaft, it can be appreciated by person of ordinary skill in the art that the device can be modified to illuminate all or a portion of the power connector 113, thereby vitiating the need for this additional connection.

FIG. 16a is a schematic diagram of a modified embodiment of lever and phase gear power transmission system shown in FIG. 15 adapted for an intermediate gear ratio in a first position.

FIG. 16b is a schematic diagram of the modified embodiment of lever and phase gear power transmission system of FIG. 16a in a second position.

FIG. 17a is a schematic diagram of a modified embodiment of lever and phase gear power transmission system shown in FIG. 15 adapted for an neutral gear ratio in a first position.

FIG. 17b is a schematic diagram of the modified embodiment of lever and phase gear power transmission system of FIG. 17a in a second position.

Figure 18B:
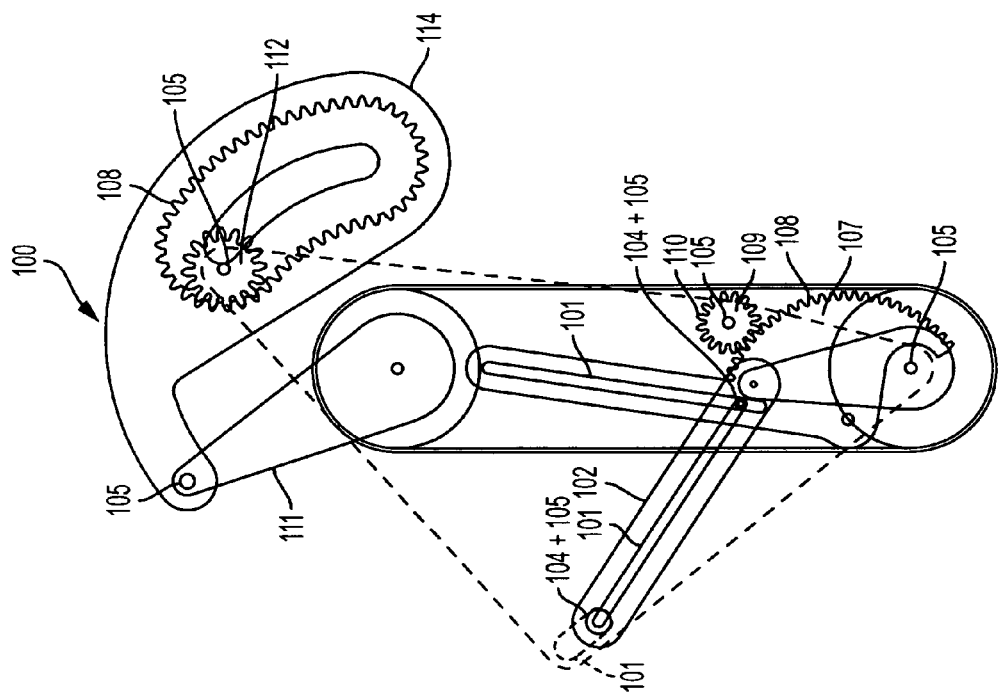
FIG. 18b is a schematic diagram of the modified embodiment of lever and phase gear power transmission system of FIG. 18a in a second position.
Figure 18A:
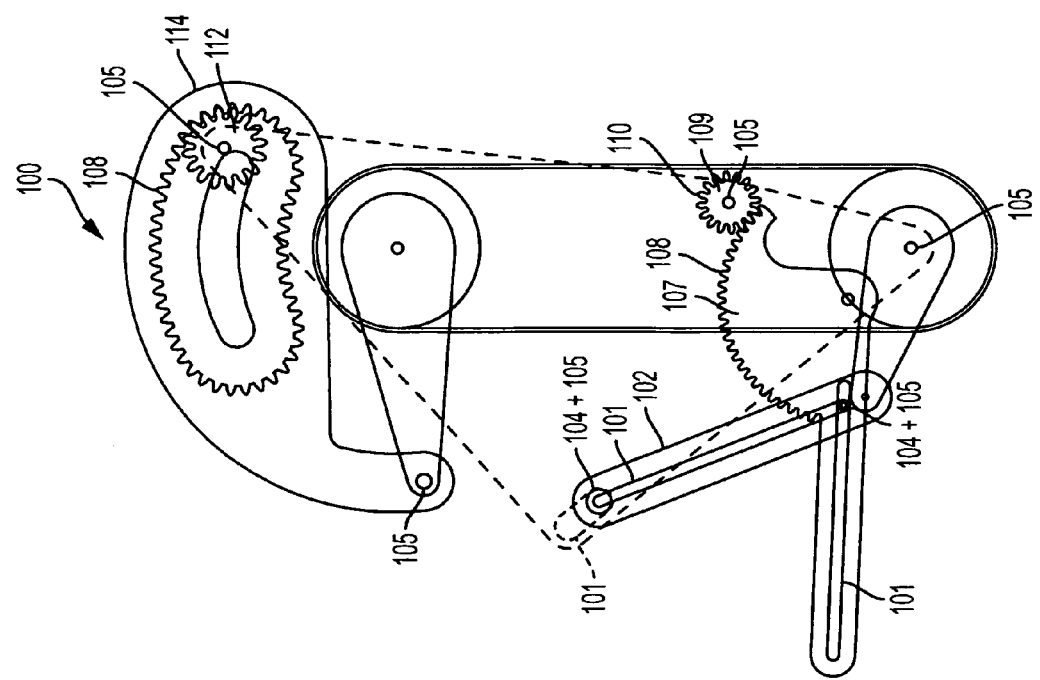
FIG. 18a is a schematic diagram of a modified embodiment of lever and phase gear power transmission system shown in FIG. 15.

FIG. 18a is a schematic diagram of a modified embodiment of lever and phase gear power transmission system shown in FIG. 15. In FIG. 18, the power connector is shown by a circular belt or chain.

FIG. 18b is a schematic diagram of the modified embodiment of lever and phase gear power transmission system of FIG. 18a in a second position.

FIGS. 19 a-e illustrate an embodiment of a variable lever mechanism according to the invention showing the device in several positions.

The variable lever is a set of intersecting levers, with 2 different centers of rotation. The input lever has a fixed arc of travel. The output lever has a variable arc of travel. The two levers are connected by a variable connection, in this case a cog that moves up and down a linear track. By moving the location of the cog, one can change the ratio between input and output. In the model, the output is a gear segment which turns another gear on a ratcheting freewheel.

There is an infinite number of positions along the track, and moving he cog all the way to position 0 is neutral. The ratchet on the freewheel can be reversible, thus creating a reverse motion.

Figure 20:
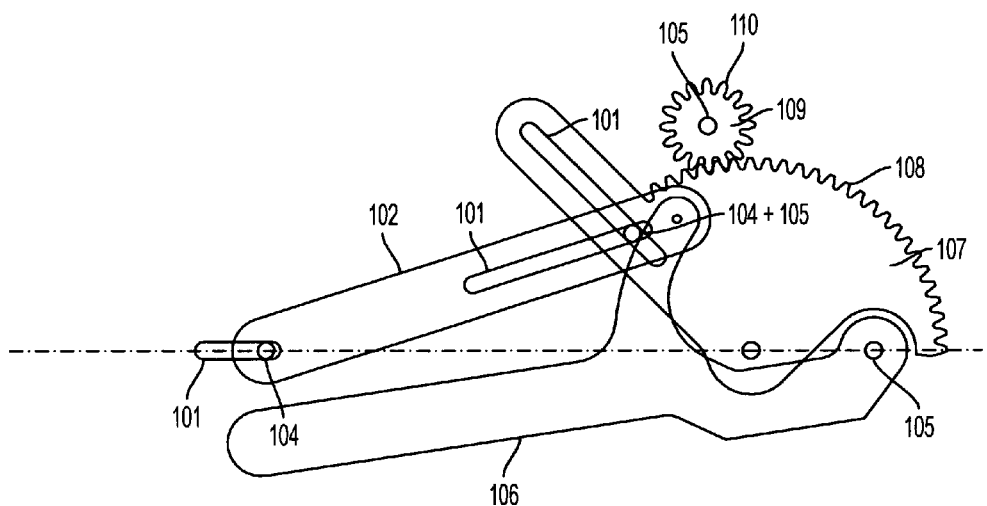
FIG. 20 illustrates an alternative embodiment of a variable lever mechanism according to the invention.

FIG. 20 illustrates an alternative embodiment of a variable lever mechanism according to the invention, and which can be adapted for use with a lever and gear mechanism shown in FIGS. 15-18. Specifically, an alternative embodiment a variable lever 200 is shown with a ratcheting mechanism having variable output ratio.

The foregoing embodiments are set forth in an illustrative and not in a limiting sense. The scope of the invention is defined by the claims appended hereto.

I claim:

1. A lever and phase gear mechanism attached to a frame for transmitting force between a drive shaft and output gear, comprising:

A first lever 106, a second lever 111, a power connector 113, a power transfer lever 102, a gear transmission 107, a phase gear 114, and input gear 112, and output gear 109, wherein the first lever 106 is rotatably connected the frame at a first portion of the lever, rotatably connected to the power transfer lever 102 at a second portion of the lever, and rotatably connected to a first portion of the power connector 113 at a third portion of the lever; wherein the power connector 113 includes a second portion, which second portion is rotatably connected to the second lever 111 at a first portion of the second lever; wherein the second lever includes a second and third portion, wherein the second portion of the second lever is rotatably connected to a first portion of the phase gear 114, and the third portion of the second lever is rotatably connected to the frame; wherein the phase gear 114 includes a continuous internal gear surface 108, said gear surface cooperating with the input gear 112 (85), which is disposed therein, wherein The input gear 112 is rotatably connected to the frame and is adapted for connection to a drive shaft, wherein the power transfer lever 102 includes a power transfer lever cog track 101 and first cog pivot 104/105 slidably connected to the power transfer lever cog track 101, and wherein the power transfer lever 102 includes a second pivot cog 104/105 at one end of the power transfer lever 102 for connection to a first cog track 101 disposed at one portion of said frame; wherein the first cog pivot 104/105 is slidably and rotatably connected to a second cog track 101 disposed at the gear transmission 103, wherein the gear transmission 107 includes a gear surface 108 which gear surface 108 cooperates with the output gear 109; and wherein the output gear 109 is rotatably connected to said frame F, and includes a continuous gear surface 108 which cooperates with the gear surface of the gear transmission 107, and wherein the continuous gear surface of the phase gear includes a power segment, travel segment, first joiner segment between power segment and travel segment, and second joiner segment between travel segment and power segment, the power segment and the travel segment each having a radius of curvature originating at a lever pivot point, and the power segment having a greater radius than the travel segment.

2. The lever and gear mechanism according to claim 1, wherein
the output gear further includes a one-way clutch.

3. The lever and gear mechanism according to claim 1, wherein
the input gear further includes a one-way clutch connected to the drive shaft.

4. A variable lever mechanism for connection to a frame, comprising:

a lever frame 205, a drive gear 201, and output gear 202, a power transfer lever 203, and an input lever 204, wherein the lever frame 205 comprises a first pivot, a second pivot, a third pivot 105, and a first cog track 101 with a first cog 104 slidably disposed therein;

the drive gear 201 is rotatably connected to the second pivot of the frame F, wherein the drive gear includes a gear surface 108 along at least a portion of its outer edge, wherein the drive gear 201 further includes a second cog track 101 with a second cog 104 slidably disposed therein, the power transfer lever 203 comprises a third cog track with a third cog 104 slidably disposed therein, which power transfer lever 203 is rotatably connected at a first end of the power transfer lever 203 to the first cog 104 of the lever frame 205, and a second end of the power transfer lever 203 is rotatably connected to a first portion of an input lever 204, wherein the third cog 104 is rotatably connected to the second cog 104 of the drive gear 201;

wherein the input lever 204 is rotatably connected at a second portion of the input lever 204 to the frame at the third pivot of the frame; and wherein the output gear 202 comprises a continuous gear surface 108 which cooperates with the gear surface of the drive gear 201, wherein the output gear 202 is rotatably connected to the first pivot of frame 205.

5. The variable lever mechanism according to claim 4, wherein
the output gear 202 further comprises a one-way clutch.

* * * * *